United States Patent
Chan et al.

[11] Patent Number: 5,320,383
[45] Date of Patent: Jun. 14, 1994

[54] AUTOMATIC VENTING SUPPLEMENTAL INFLATABLE RESTRAINT SYSTEM

[75] Inventors: Tai L. Chan, Troy; Robert G. Wooley, Westland; Thomas R. Barszcz, Farmington Hills; James M. Lawlis, Grosse Pointe Farms; John M. Sohn; Richard R. Kaminski, both of Grosse Pointe Woods, all of Mich.

[73] Assignee: General Motors Corporation, Detroit, Mich.

[21] Appl. No.: 84,902

[22] Filed: Jul. 2, 1993

[51] Int. Cl.$^5$ .............................................. B60R 21/32
[52] U.S. Cl. ............................. 280/735; 244/122 AG
[58] Field of Search ............ 280/728 R, 735; 454/75; 244/122 AG, 121, 122 R

[56] References Cited

U.S. PATENT DOCUMENTS

| | | | |
|---|---|---|---|
| 3,632,133 | 1/1972 | Hass | 280/150 |
| 3,847,411 | 11/1974 | Herrmann | 280/725 |
| 4,665,350 | 5/1987 | Angi et al. | 318/254 |
| 4,877,264 | 10/1989 | Cuevas | 280/731 |
| 5,026,006 | 6/1991 | Tinder et al. | 244/122 AG |
| 5,071,161 | 12/1991 | Mahon et al. | 280/739 |
| 5,246,083 | 9/1993 | Graf et al. | 280/725 |

FOREIGN PATENT DOCUMENTS

| | | | |
|---|---|---|---|
| 0088241 | 3/1990 | Japan | 280/728 R |
| 0246137 | 11/1991 | Japan | 280/728 R |

Primary Examiner—Richard M. Camby
Assistant Examiner—Christopher P. Ellis
Attorney, Agent, or Firm—Anthony L. Simon

[57] ABSTRACT

An apparatus includes a deployable supplemental inflatable restraint, which, after a deployment, vents supplemental inflatable restraint internal contenst to a vehicle passenger compartment, a signal line for sensing deployment of the supplemental inflatable restraint, a command generator for developing a command responsive to the sensed deployment, and an atmosphere control system for providing a flow of fresh air into the vehicle passenger compartment responsive to the developed command.

2 Claims, 4 Drawing Sheets

AUTOMATIC VENTING SUPPLEMENTAL INFLATABLE RESTRAINT SYSTEM

This invention relates to a system for refreshing vehicle passenger compartment air after deployment of a supplemental inflatable restraint (SIR) system.

BACKGROUND OF THE INVENTION

In typing supplemental inflatable restraint systems, the supplemental inflatable restraint inflate an airbag upon sensing a sudden deceleration of the vehicle and then quickly deflates. In some typical systems, the contents of the inflated supplemental inflatable restraint are released into the vehicle passenger compartment upon deflation of the supplemental inflatable restraint. Such contents include both particulate and non-particlate matter.

SUMMART OF THE PRESENT INVENTION

This invention provides an apparatus and method for refreshing the air of a vehicle passenger compartment after deployment and deflation of a supplemental inflatable restraint. Advantageously, this invention provides fresh air into a vehicle passenger compartment upon deflation of a supplemental inflatable restraiant. Advantageously, this invention purges the vehicle passenger compartment of gases and particles expelled by the supplemental inflatable restraint and replaces those contents with fresh air from outside the vehicle.

Advantageously, the apparatus of this invention comprises: (a) a supplemental inflatable restraint deployment system including an inflatable restraint that characteristically, upon deflation, empties its contents into a vehicle passenger compartment; (b) means for sensing deployment of the supplemental inflatable restraint and for providing an air refresh command in response to the sensed deployment; and (c) means for providing a flow of fresh air into the vehicle passanger compartment responsive to the air refresh command.

Advantageously, the method of this invention maintains air quality in a vehicle passenger compartment atmosphere and comprises the steps of (a) sensing deployment of a supplemental inflatable restraint, and (b) activating a vehicle passenger compartment air refresh system in response to the sensed deployment, thereby providing fresh air into the vehicle's passenger compartment and forcing air existing within the vehicle passenger compartment, including gases and particulate matter expelled from the supplemental inflatable restraint, out of the vehicle passenger compartment.

A more detailed description of the apparatus and method of this invention is set forth below.

DETAILED DESCRIPTION OF THE INVENTION

Figure 1:
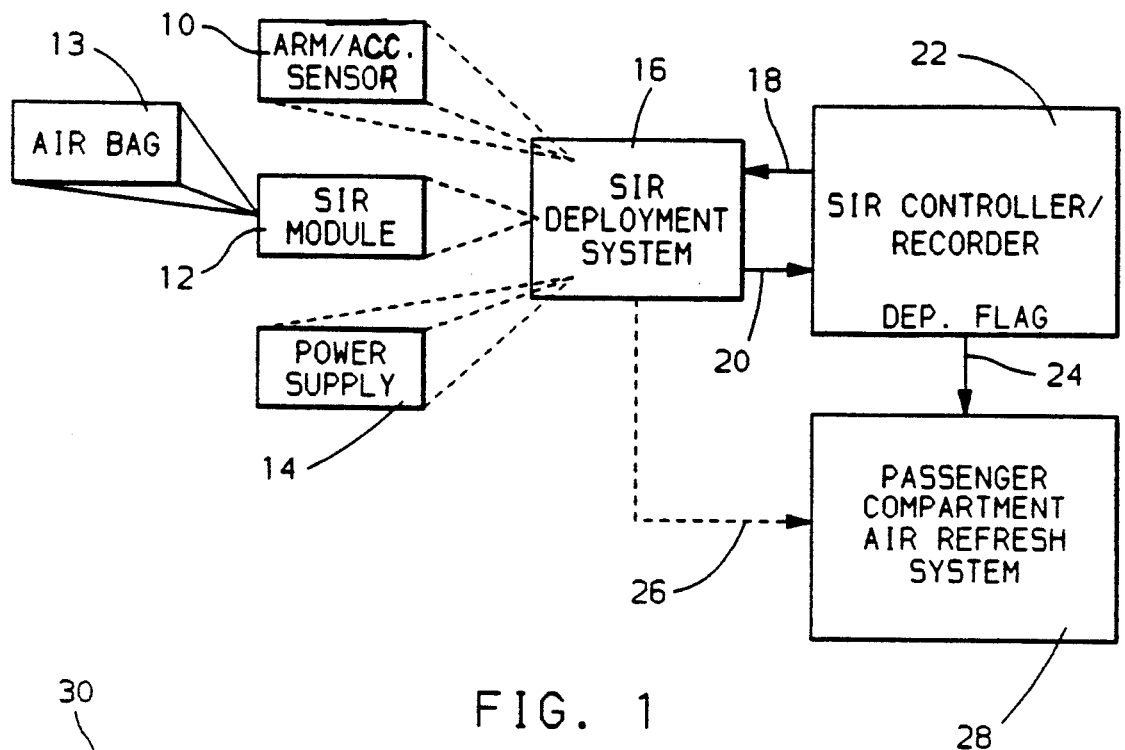
FIG. 1 illustrates the apparatus and method of this invention.

Referring to FIG. 1, the apparatus of this invention comprises a supplemental inflatable restraint deployment system 16 with its associated supplemental inflatable restraint system controller/recorder 22 and passenger compartment air refresh system 28.

The supplemental inflatable restraint system 16 typically comprises arming and/or acceleration and/or deployment sensors 10, inflator module(s) 12 comprising squibs (detonating devices), inflators, and airbags 13, and a power supply 14, which typically contains an energy reserve for use in the event of vehicle power disconnect during a sudden deceleration of the vehicle. The supplemental inflatable restraint deployment system 16 may be controlled and/or monitored by the controller/recorder 22 via lines 18 and 20. The deployment system 16 and controller/recorder 22 and their implementations are both well known to those skilled in the art.

In response to a deployment of the supplemental inflatable restraint system, controller/recorder 22 outputs, on line 24, a flag indicating that deployment has occurred. Since deflation of the supplemental inflatable restraint module is typically automatic, the flag on line 24 also indicates that, after a short time period, the supplemental inflatable restraint has deflated and expelled its internal contents, at least partially, into the vehicle passenger compartment. In response, the vehicle passenger compartment air refresh system 28 activates a means, described in more detail further below, for providing fresh air into the vehicle passenger compartment and for forcing the former contents of the vehicle supplemental inflatable restraint out of the vehicle passenger compartment.

In another implementation of this invention, controller/recorder 22 may be either omitted or bypassed. In this implementation, line 26 is added to provide a signal indicative of deployment of the supplemental inflatable restraint system 16, to directly trigger passenger compartment air refresh system 28.

Figure 2:
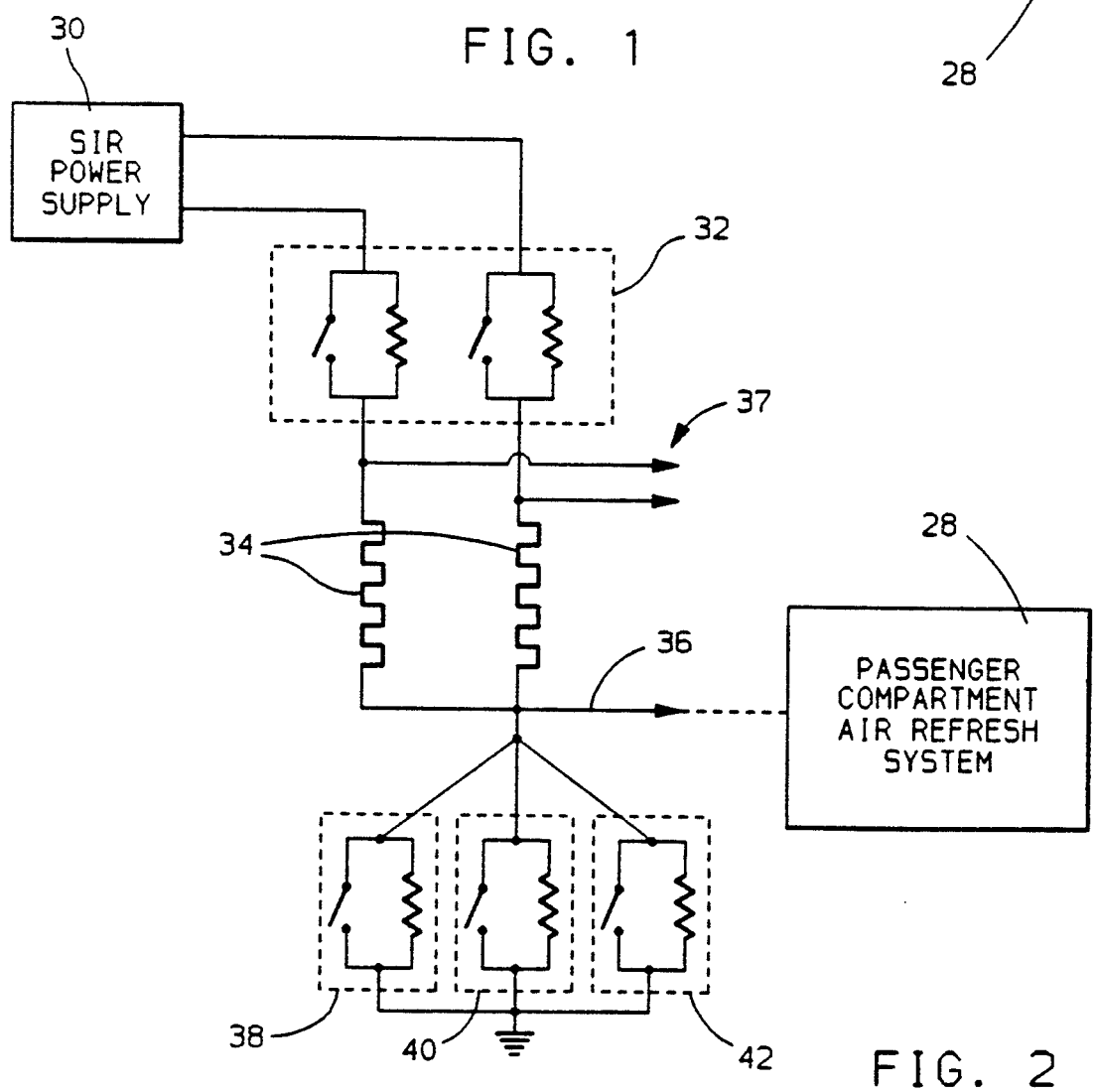
FIG. 2 illustrates the apparatus of this invention with a typical supplemental inflatable restraint deployment system.

Referring to FIG. 2, a typical vehicle supplemental inflatable restraint system is shown implemented with this invention. The system shown includes power supply 30, arming sensor 32 (double throw), squibs 34, signal lines 36 and 37 and deployment sensors 38, 40 and 42. In the implementation shown, the sensors used represent electromechanical deceleration sensors of a type well known to those skilled in the art and commonly used in supplemental inflatable restraint systems. The power supply 30 typically comprises a direct link to the vehicle power supply and a reserve energy source for use in the event of a power disconnect during a sudden deceleration of the vehicle.

In response to a sensed deceleration of the vehicle, arming sensor 32 closes and completes the current path to one end of deployment squib 34. With a closing of any one of the sensors 38, 40 and 42, the current path from the second end of the squib 34 to ground is completed and squib 34 initiates deployment of the supplemental inflatable restraint in a manner well known to those skilled in the art. While only one deployment sensor is necessary, redundancy, as shown may be implemented. For example, sensor 38 may be located on the left-hand side of the vehicle, sensor 42 may be located on the right-hand side of the vehicle and sensor 40 may be located at the front end of the vehicle.

When any of the deployment sensors 38, 40 or 42 closes, line 36 goes low, sending a signal to the passenger compartment air refresh system 28 according to this invention. In response, passenger compartment air refresh system 28 commences flow of fresh air into the vehicle passenger compartment and expels air previously in the passenger compartment, including contents that were previously in the vehicle supplemental inflatable restraint.

Figure 3:
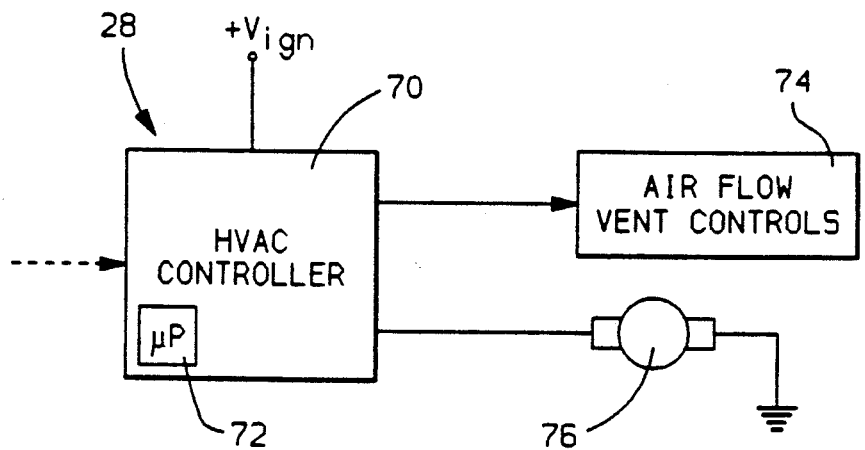
FIG. 3 illustrates one implementation of the apparatus of this invention using an HVAC controller.

Referring to FIG. 3, one implementation of the passenger compartment air refresh system 28 includes HVAC controller 70, its associated microprocessor 72, air flow vent controls 74 and HVAC blower motor 76. The HVAC controller may be any such controller as is currently used in vehicles with automatic climate control systems.

In accordance with the apparatus and method of this invention, the microprocessor 72 contains in its memory a software program that runs a routine for commencing air flow through the vehicle passenger compartment in response to a sensed deployment of the supplemental inflatable restraint system. An example flow routine run by microprocessor 72 is shown in FIG. 4.

Figure 4:
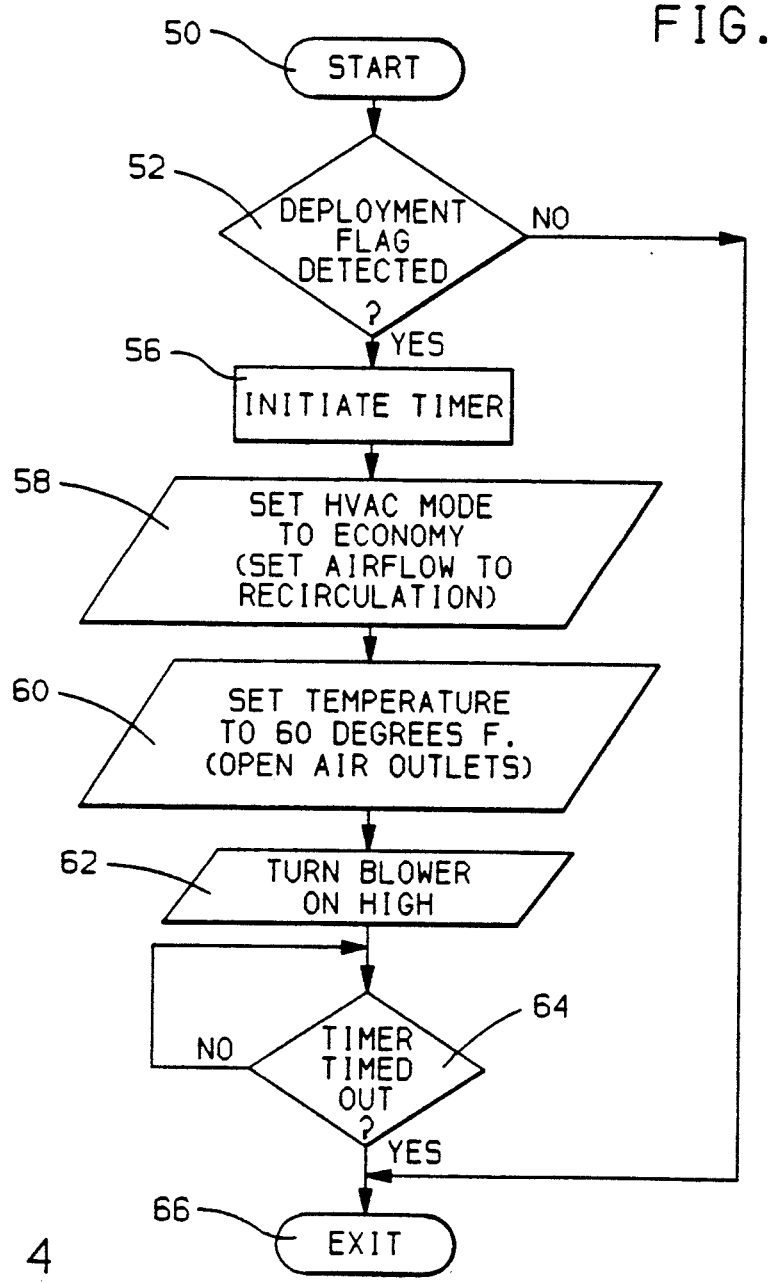
FIG. 4 illustrates a computer flow diagram for implementation of this invention with the apparatus of FIG. 3.

Referring to FIG. 4, the flow routine starts at block 50 and moves to block 52, where the microprocessor checks for a flag indicating deployment of the supplemental inflatable restraint system. If no flag is detected, the routine moves to block 66 where it is exited. If a flag is detected at block 52, the rountine moves to block 56 where a timer is initiated.

The timer is set according to this invention, to allow the air refresh system to continuously refresh air to the vehicle passenger compartment for a period of time after deployment of the supplemental inflatable restraint system. The time period desired may vary from vehicle to vehicle as characteristics of vehicle air flow systems vary. Typically, the air refresh time period is five to fifteen minutes.

At block 58, a command is sent to the HVAC controller to indicate economy mode or to otherwise set the air flow to recirculation mode. At block 66, the temperature commanded is set to 60 degrees Fahrenheit or otherwise a command is given to effectively open the air outlets (via valve 91) for the air conditioning system to allow air flow into the vehicle passenger compartment. At block 62, a command is sent to the HVAC blower, preferably turning the blower on high, to force air into the vehicle passenger compartment and to force the vehicle passenger compartment atmospheric contents to exit the vehicle passenger compartment through body relief valves, door leaks and cracks in the vehicle.

At block 64, the routine checks to determine if the timer has timed-out, which would indicate that the air refresh system has cycled for the desired time period. If the timer has timed-out, the routine is exited at block 66.

Figure 5:
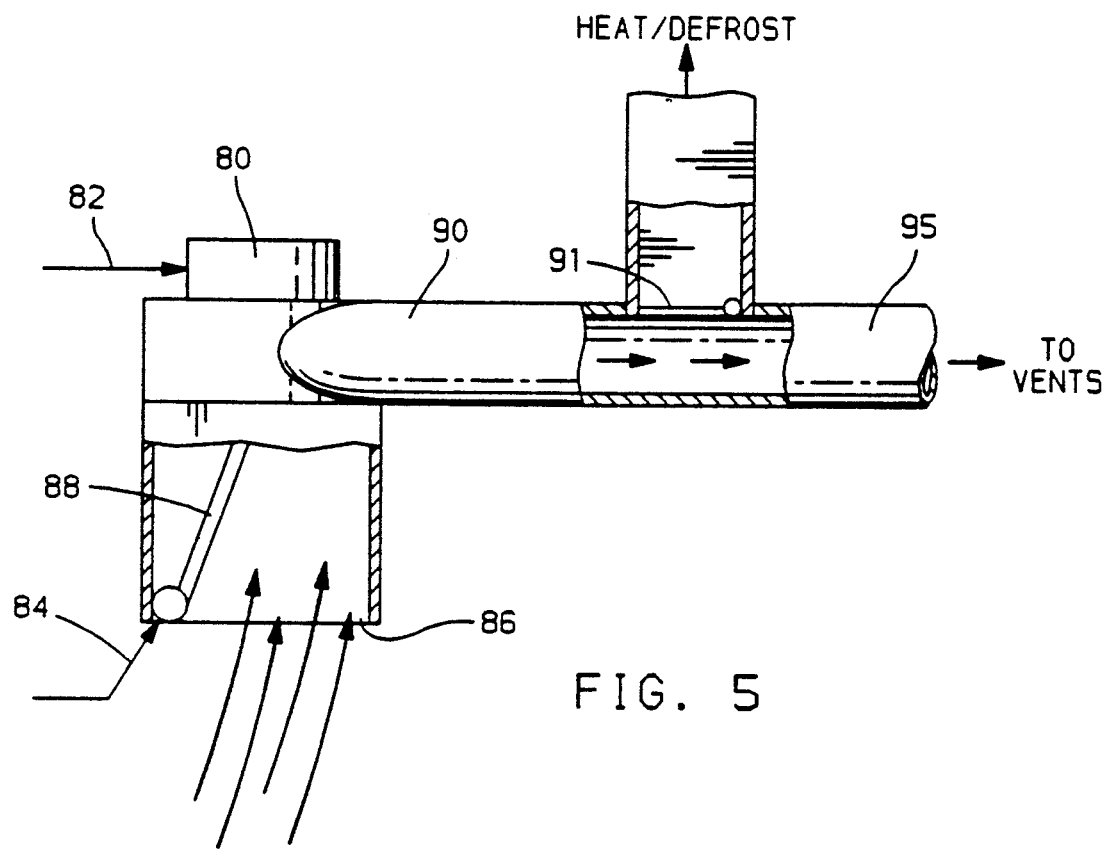
FIG. 5 illustrates control of an HVAC inlet valve and blower motor according to this invention.

Referring to FIG. 5, a climate control system blower motor 80, air inlet valve 88 and air outlet valve 91 are shown, which, according to this invention, are commanded by representative command lines 82 and 84, to turn blower motor 80 on high and to open valves 88 and 91 as shown allowing fresh air in inlet 86. Blower 80 draws air through inlet 86 and forces the air through duct 90 to the vehicle's air distribution system via duct 95 leading to the vent outlets (not shown).

Figure 6:
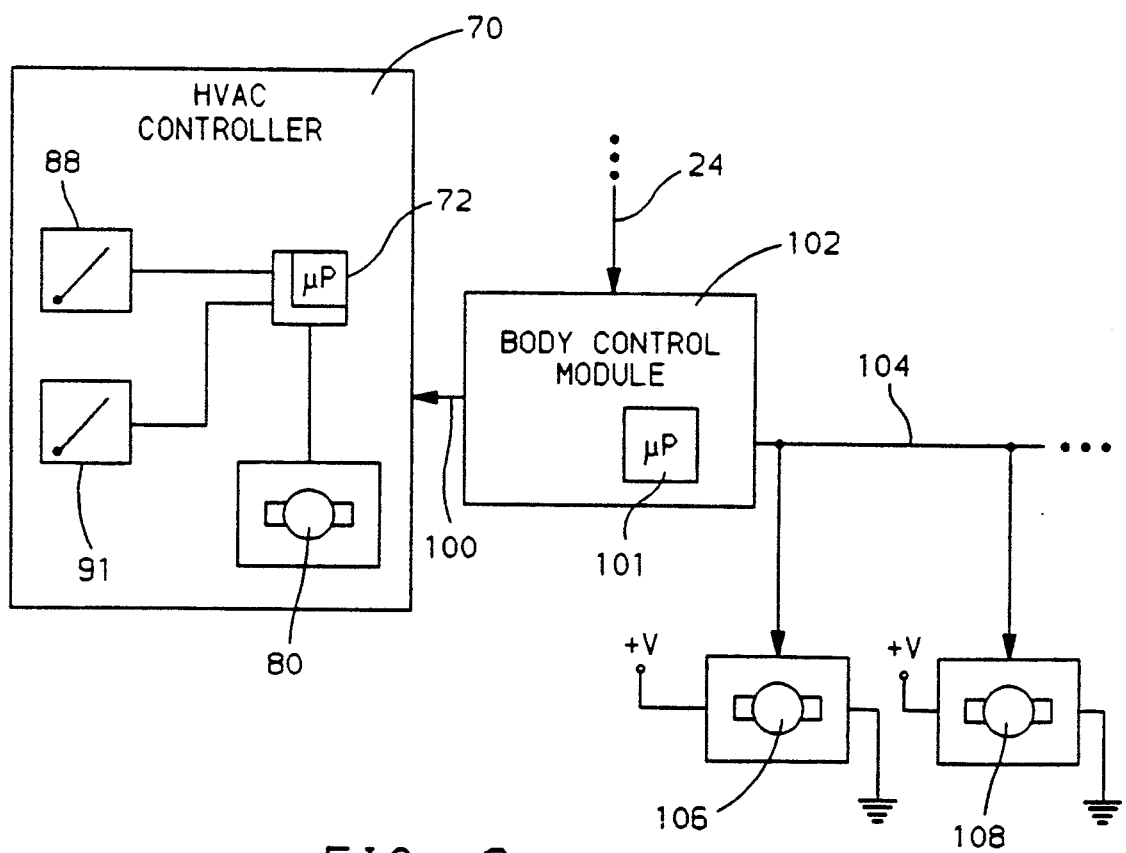
FIG. 6 illustrates another implementation of the apparatus of this invention.

Referring to the example implementation of this invention shown in FIG. 6, many vehicles include a body control module 102 or equivalent, which is a microcomputer based module that monitors and controls the vehicle's body systems, such as HVAC climate control, displays, power windows, power locks, vehicle lighting, etc.. According to this invention, signal line 24, carrying the supplemental inflatable restraint deployment flag, is input to the body control module 102 and processed by its micropreocessor 101. In response to the sensed flag on line 24, body control module 102 sends a signal through bus 100 to the HVAC controller 70 and its microprocessor 72, which sends control commands to the HVAC inlet vent valve 88, air outlet valve 91 and blower motor 80.

Alternatively, or in addition to the commands sent to the HVAC controller, commands may be sent via line 104 to the vehicle power windows commanding the power window motor 106 and 108 to roll down the vehicle power windows, thus providing fresh air to the vehicle passenger compartment via the open windows. Activation of motors 106 and 108 in response to the signal on line 104 is easily implemented by those skilled in the art.

Figure 7:
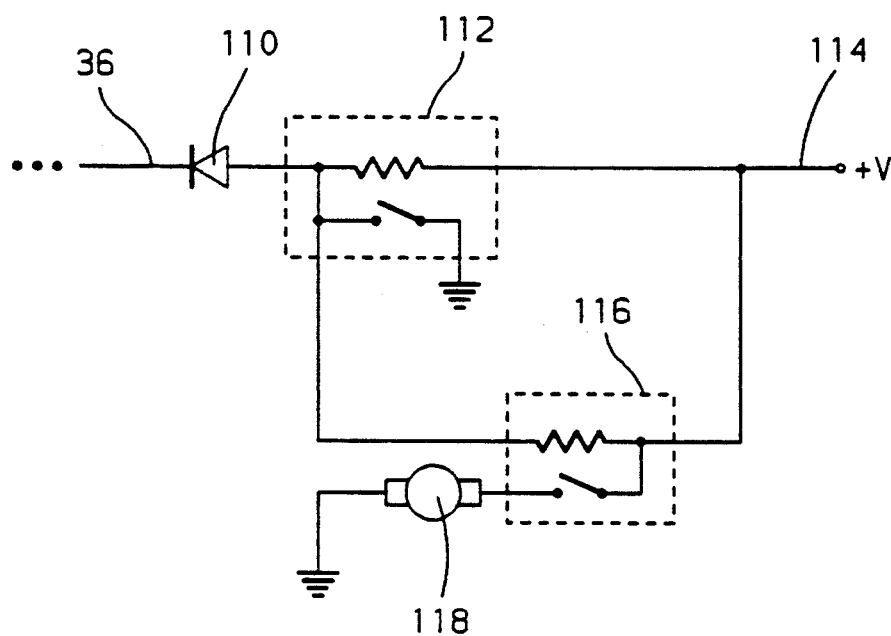
FIGS. 7 and 8 illustrate two motor control implementations of this invention.
Figure 8:
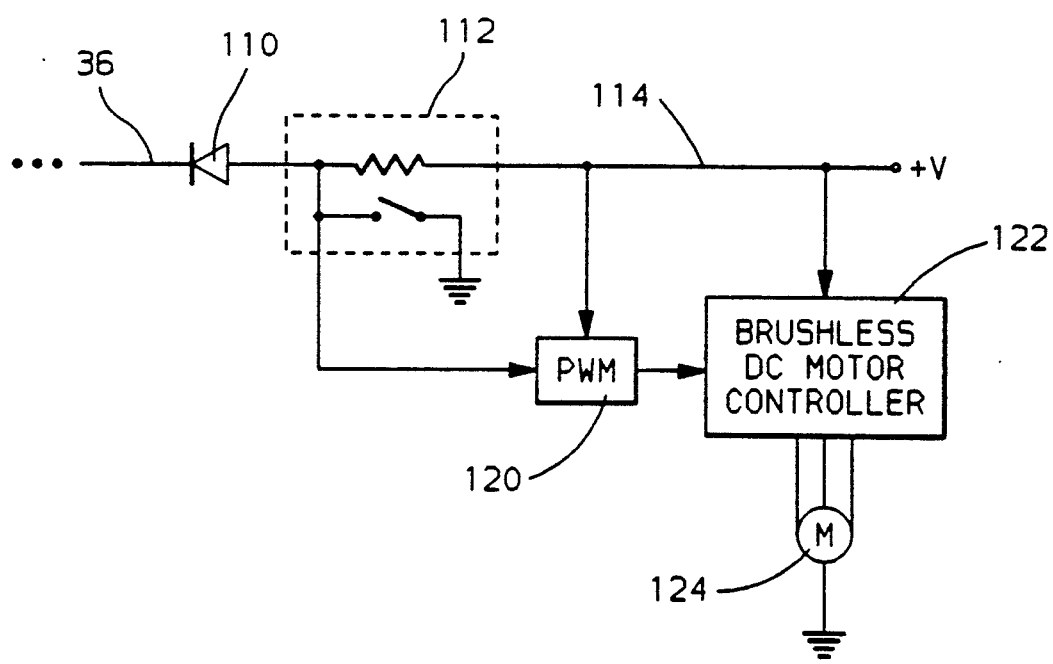

Referring to FIGS. 7 and 8, two example implementations of this invention are shown in which microprocessor control of the air refreshe system is omitted. Referring to FIG. 7, two additional electromechanical acceleration sensors 112 and 116 are connected as shown between a vehicle power supply line 114 and line 36 via diode 110. Sensors 112 and 116 are latching sensors that remain closed when a sudden deceleration of sufficient intensity is detected. Upon closure of arming sensor 116 and either sensor 112 or sensors 38, 40 or 42, shown in FIG. 2, DC motor 118 is activated. DC motor 118 may either be the blower motor for the climate control system or, in the power window implementation, the power window motor. In this implementation, sensors 38, 40 and 42 are also latching sensors.

Fig. 8 is an example implementation for systems in which the HVAC blower motor is a brushless DC motor. In the system shown, diode 110 and latching sensor 112 are connected between lines 136 and 114 in the manner similar to that shown in FIG. 7. When either sensor 112 or sensors 38, 40 or 42 is closed, a signal is provided to pulse-width modulation circuitry 120, which provides a pulse-width modulated signal to the brushless DC motor controller 122, as shown. Brushless DC motor controller 122, in turn, activates brushless DC blower motor 124 to force air into the vehicle passenger compartment through the air inlet vents.

The pulse-width modulation signal may be created by any suitable modulating signal source 120, which may be easily implemented by those skilled in the art. Brushless DC motor controller 122 may be any standard brushless DC motor controller suitable for use witha brushless DC HVAC motor. An example of a suitable motor controller is shown in U.S. Pat. No. 4,665,350 issued May 12, 1987 and assigned to the assignee of this invention.

Advantageously, the method of this invention embodied in the description above comprises the steps of: (a) sensing a sudden deceleration of a vehicle; (b) deploying a supplemental inflatable restraint in response to the sensed sudden deceleration of the vehicle; (c) deflating the supplemental inflatable restraint in a manner allowing at least some of the internal contents of the supplemental inflatable restraint to enter the vehicle passenger compartment; and (d) after deflation of a supplemental inflatable restraint, providing a flow of fresh air into the vehicle passenger compartment.

The above described implementations of this invention are example implementations, not limiting on the scope of this invention. Moreover, various improvements and modifications to this invention may occur to those skilled in the art and such improvements and modifications will fall within the scope of this invention as set forth below.

The embodiments of the invention in which an exclusive property or privilege is claimed are defined as follows:

1. An apparatus comprising:
   a motor vehicle climate control system comprising
     a microprocessor,
     a blower motor,
     an air inlet duct,
     air ventilation ducts,
     a first valve controllable to affect air flow to the air inlet duct, and
     a second valve controllable to affect air flow in the air ventilation ducts between a defrost air outlet and a vent air outlet;
   means for sensing a sudden deceleration of the vehicle;
   means for inflating a supplemental inflatable restraint responsive to the sensed sudden deceleration of the vehicle;
   means for deflating the supplemental inflatable restraint after the inflation thereof;
   means, activated after deflation of the supplemental inflatable restraint and including the microprocessor, for controlling the first valve to allow air inflow into the air inlet duct;
   means, activated after deflation of the supplemental inflatable restraint and including the microprocessor, for controlling the second valve to control air flow to the defrost air outlet and vent air outlet; and
   means, activated after deflation of the supplemental inflatable restraint for activating the blower motor.

2. The apparatus of claim 1 wherein the means for controlling the second valve directs airflow to the vent air outlet and away from the defrost air outlet after deflation of the supplemental inflatable restraint.

* * * * *

UNITED STATES PATENT AND TRADEMARK OFFICE
CERTIFICATE OF CORRECTION

PATENT NO. : 5,320,383
DATED : June 14, 1994
INVENTOR(S) : Chan, et al

It is certified that error appears in the above-indentified patent and that said Letters Patent is hereby corrected as shown below:

On the title page, item [75] Inventors: should read --Tai L. Chan, Troy; Robert G. Wooley, Westland; Thomas R. Barszcz, Farmington Hills; James M. Lawlis, Grosse Pointe Farms; John M. Sohn, Grosse Pointe Woods; Elias T. Boueri, Novi; Richard R. Kaminski, Grosse Pointe Woods, all of Mich.

Signed and Sealed this

Fourteenth Day of March, 1995

Attest:

BRUCE LEHMAN

Attesting Officer

Commissioner of Patents and Trademarks